United States Patent
Wegelin et al.

(10) Patent No.: US 9,311,790 B2
(45) Date of Patent: Apr. 12, 2016

(54) SYSTEMS AND METHODS FOR LOCATING A PUBLIC FACILITY

(71) Applicant: GOJO Industries, Inc., Akron, OH (US)

(72) Inventors: Jackson W. Wegelin, Stow, OH (US); Marcella Kanfer Rolnick, Akron, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 217 days.

(21) Appl. No.: 13/792,036

(22) Filed: Mar. 9, 2013

(65) Prior Publication Data

US 2014/0197924 A1 Jul. 17, 2014

Related U.S. Application Data

(60) Provisional application No. 61/752,668, filed on Jan. 15, 2013.

(51) Int. Cl.
  *G08B 5/22* (2006.01)
  *H04W 4/00* (2009.01)
  *G01C 21/20* (2006.01)

(52) U.S. Cl.
  CPC ............ *G08B 5/22* (2013.01); *G01C 21/206* (2013.01); *H04W 4/008* (2013.01)

(58) Field of Classification Search
  CPC ........ G08B 5/22; G01C 21/20; G01C 21/343; G01C 21/206; G01S 13/825; H04W 4/02
  USPC ........................................................ 340/8.1
  See application file for complete search history.

(56) References Cited

U.S. PATENT DOCUMENTS

| | | |
|---|---|---|
| 2003/0046339 A1* | 3/2003 | Ip .................................. 709/203 |
| 2003/0194980 A1 | 10/2003 | Peterson, III et al. |
| 2004/0068441 A1* | 4/2004 | Werbitt .......................... 705/16 |
| 2004/0215532 A1* | 10/2004 | Boman et al. ................... 705/28 |
| 2010/0135178 A1 | 6/2010 | Aggarwal et al. |
| 2010/0157848 A1 | 6/2010 | Das et al. |
| 2010/0332022 A1 | 12/2010 | Wegelin et al. |
| 2011/0105150 A1 | 5/2011 | Moon et al. |
| 2012/0009924 A1 | 1/2012 | Lee |
| 2012/0202531 A1* | 8/2012 | Killian et al. ................ 455/457 |
| 2012/0245729 A1 | 9/2012 | Wegelin et al. |

OTHER PUBLICATIONS

WIPO, International Search Report and Written Opinion of the Searching Authority, dated Jul. 28, 2014, in related Application No. PCT/US2014/010011.

* cited by examiner

*Primary Examiner* — Omer S Khan
(74) *Attorney, Agent, or Firm* — Calfee, Halter & Griswold LLP

(57) ABSTRACT

In an exemplary method of locating a public facility, a public facility is provided at a fixed location and includes a facility locating module. A wireless signal is generated from the facility locating module. Software code accessible to the portable electronic device is provided. The software code causes the portable electronic device to detect the wireless signal and to generate a location indicating output from the portable electronic device to identify at least one of a location of the public facility, a distance to the public facility from the portable electronic device, and a direction from the portable electronic device to the public facility.

7 Claims, 5 Drawing Sheets

SYSTEMS AND METHODS FOR LOCATING A PUBLIC FACILITY

RELATED APPLICATIONS

This non-provisional utility patent application claims priority to and the benefits of U.S. Provisional Patent Application Ser. No. 61/752,668 filed on Jan. 15, 2012 and SYSTEMS AND METHODS FOR LOCATING A PUBLIC FACILITY. This application is incorporated herein by reference in its entirety.

BACKGROUND OF THE INVENTION

Public facilities, such as, for example, hygienic facilities (e.g., soap dispensers, restrooms), food/drink accommodation facilities (e.g., water fountains, vending machines), and safety facilities (e.g., fire extinguishers, first aid kits, defibrillators, eyewash stations) are often situated in one or more inconspicuous locations in a public building or other public area, without a clear indication to the public at large as to the existence or location of the public facility.

SUMMARY

Exemplary embodiments of facility locating systems and methods are described herein. In an exemplary method of locating a public facility, a public facility is provided at a fixed location and includes a facility locating module. A wireless signal is generated from the facility locating module. Software code accessible to the portable electronic device is provided. The software code causes the portable electronic device to detect the wireless signal and to generate a location indicating output from the portable electronic device to identify at least one of a location of the public facility, a distance to the public facility from the portable electronic device, and a direction from the portable electronic device to the public facility.

In another exemplary method of locating a public facility, a public facility is provided at a fixed location and includes a facility locating module. An interrogation signal from a portable electronic device is received in at least one location identifying module within range of the interrogation signal. A location of the at least one location identifying module is used to estimate the current location of the portable electronic device. A database identifying a plurality of public facilities and a corresponding location of each of the plurality of public facilities is accessed. The estimated current location of the portable electronic device and the accessed database are used to generate a location identifying output to identify at least one of a location of at least one of the plurality of public facilities, a distance to the at least one of the plurality of public facilities from the portable electronic device, and a direction from the portable electronic device to the at least one of the plurality of public facilities.

In still another exemplary method of locating a public facility, an interrogation signal is transmitted from a facility locating module associated with the public facility to at least one location identifying module within range of the interrogation signal. A locating signal is transmitted from the at least one location identifying module in response to the interrogation signal, with the locating signal corresponding to an estimated location of the public facility. The locating signal is used to generate a location identifying output at an electronic device to identify at least one of the estimated location of the public facility, a distance to the estimated location of the public facility from the electronic device, and a direction from the electronic device to the estimated location of the public facility.

An exemplary system for locating a public facility includes software stored on a computer readable medium and accessible to a portable electronic device, and a facility locating module associated with a public facility having a fixed location, with the facility locating module being configured to generate a wireless signal. The software is configured to detect the wireless signal and to process the wireless signal to generate a location indicating output from the portable electronic device to identify at least one of a location of the public facility, a distance to the public facility from the portable electronic device, and a direction from the portable electronic device to the public facility.

Another exemplary system for locating a public facility includes software stored on a computer readable medium and accessible to a portable electronic device, a facility locating module associated with a public facility having a fixed location. The facility locating module is configured to generate a wireless signal, and a central server of the system stores a database identifying a plurality of public facilities and a corresponding location of each of the plurality of public facilities. The software is configured to determine a current location of the portable electronic device, and is further configured to accessing the database and to use the determined current location of the portable electronic device and the accessed database to generate a location identifying output to identify at least one of a location of at least one of the plurality of public facilities, a distance to the at least one of the plurality of public facilities from the portable electronic device, and a direction from the portable electronic device to the at least one of the plurality of public facilities.

Still another exemplary system for locating a public facility includes a facility locating module associated with the public facility, at least one location identifying module, and an electronic device. The facility locating module is configured to transmit an interrogation signal. The at least one location identifying module configured to transmit a locating signal in response to receiving the interrogation signal, with the locating signal corresponding to an estimated location of the public facility. The electronic device is configured to receive the locating signal from the at least one location identifying module, and to use the locating signal to generate a location identifying output to identify at least one of the estimated location of the public facility, a distance to the estimated location of the public facility from the electronic device, and a direction from the electronic device to the estimated location of the public facility.

In another method for locating a public facility, an estimated location of a portable electronic device is determined. A database is accessed, with the database identifying a plurality of public facilities and a corresponding location of each of the plurality of public facilities. Using the accessed database and the estimated location of the portable electronic device, a location indicating output is generated to identify at least one of a location of, a distance to, a direction to, and a proximity of at least one of the plurality of public facilities.

BRIEF DESCRIPTION OF THE DRAWINGS

These and other features and advantages of the present invention will become better understood with regard to the following description and accompanying drawings in which.

DETAILED DESCRIPTION

Figure 1:
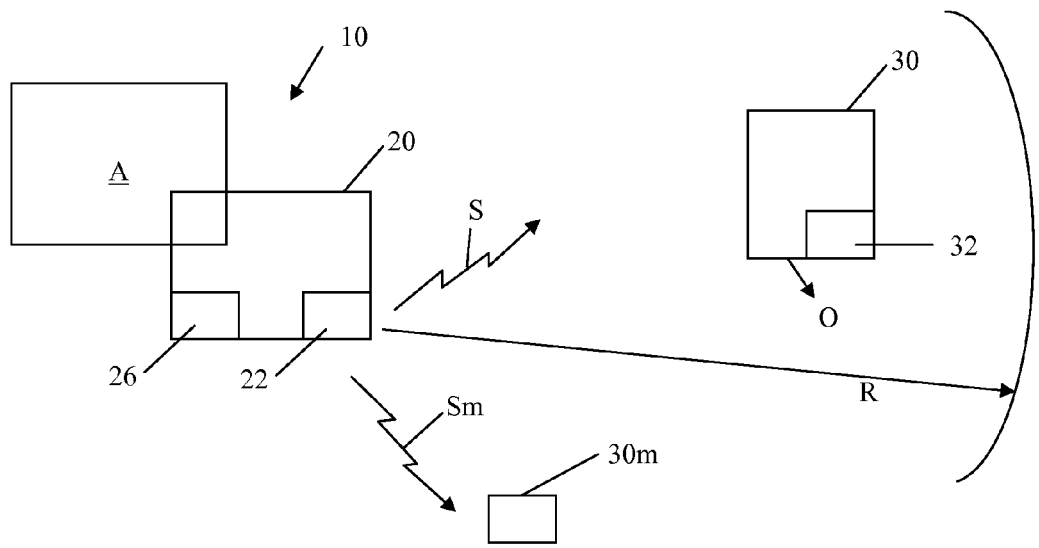
FIG. 1 is a schematic view of an electronic facility locating system, according to an exemplary embodiment.

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning.

Also, while certain exemplary embodiments described in the specification and illustrated in the drawings relate to cellular telephone enabled systems and methods for locating soap or sanitizer dispensers in a public area, it should be understood that many of the inventive features described herein may be applied to other systems and methods. For example, the features described herein may be utilized in systems and/or methods for locating other public facilities, including, for example, other types of hygienic facilities, such as restrooms, portable toilets, hand dryers, and paper towel dispensers. In other embodiments, the features described herein may be utilized in systems and/or methods for locating various types of food and drink accommodation facilities, such as water fountains, coffee makers, and vending machines. In still other embodiments, the features described herein may be utilized in systems and/or methods for locating various types of safety facilities, such as fire extinguishers, first aid kits, defibrillators, eyewash stations, and emergency exits. Other public facilities that may be located using the systems and methods described herein include, for example, a service/information desk or a lost and found department. As used herein, a public facility may include any generally fixed facility lacking an identifiable address (e.g., lacking a street address), and any generally stationary facility that may be relocated from time to time, such that the location of the facility is not easily known. In still other embodiments, other devices may be utilized to determine a location of a public facility, including, for example, desktop computers, laptop computers, tablet computers, or dedicated portable electronic devices (e.g., portable electronic key card or fob).

The present application contemplates systems and methods for identifying and/or locating one or more public facilities using a portable electronic device, such as a cellular telephone, smart phone, laptop or tablet computer. In one exemplary embodiment, an electronic locating system is configured to cause the portable electronic device to convey (e.g., by a visual display or audible communication) a specific location of the public facility, for example, by describing a location of the facility or by displaying a location of the public facility on a map. In another exemplary embodiment, an electronic locating system is additionally or alternatively configured to cause the portable electronic device to convey a position of the public facility relative to a current position of the portable electronic device, for example, by indicating a distance and direction from the portable electronic device to the facility.

According to an exemplary aspect of the present application, as schematically shown in FIG. 1, an electronic facility locating system 10 may include a wireless signal generating device or facility locating module 20 associated with (e.g., disposed within, assembled with, or proximate to) a facility A. The facility locating module 20 may include a transmitter 22 configured to generate a continuous, intermittent, or selective wireless signal S for communication with a transceiver 32 of a portable electronic device 30 (e.g., a cell phone or smart phone) within a transmission range R (e.g., approximately 100 ft) of the facility locating module. The signal S may include any suitable communication signal or combination of signals, including, for example, one or more of radio frequency (RF), infrared, Bluetooth, and Wi Fi.

The signal S may communicate the location or proximity of the public facility A in a variety of ways. For example the signal S may include information describing the location of the public facility A (e.g., "outside the stairwell on the third floor," "second floor men's restroom"), location coordinates of the public facility A (e.g., x, y coordinates, degrees latitude, longitude), and/or a received signal strength indicator (RSSI) to indicate proximity of the public facility A to the portable electronic device 30. The portable electronic device 30 may be programmed or otherwise configured to "listen" for the signal S, to process the received signal S, and to generate a location indicating output O to communicate to the user one or more of a location, location description, direction, distance, and relative proximity of the public facility. The location indicating output O may be provided in a variety of formats, including, for example, audible or visual outputs. For example, the location indicating output O may include textual or voice descriptions (e.g., distance and/or direction to facility), map images identifying the public facility location and, optionally, the portable electronic device location, and/or relative visual or audible signals (e.g., light or chime indicators of varying relative frequency and/or magnitude) that vary with proximity to the public facility. Alternatively, the location indicating output may include an electrical, electromagnetic, or other wireless signal.

Figure 4:
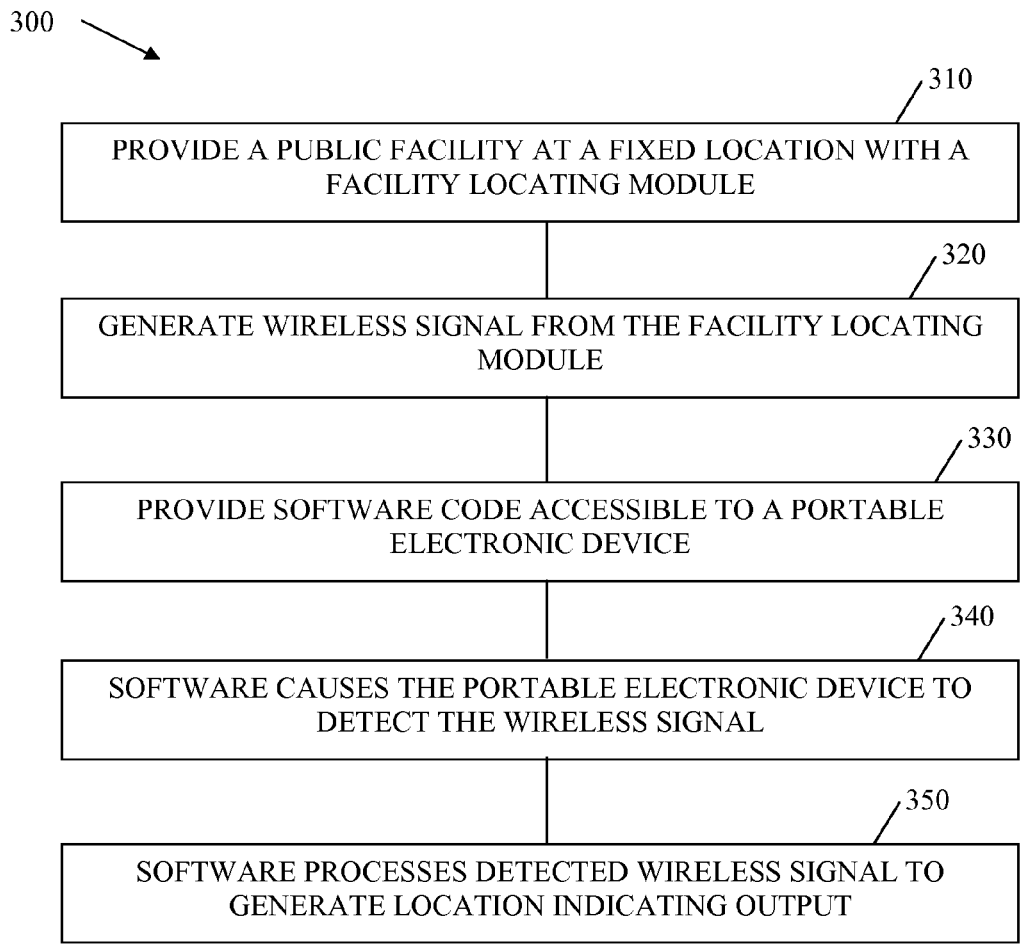
FIG. 4 is a block diagram of an exemplary method for locating a public facility.

FIG. 4 illustrates an exemplary method 300 for locating a public facility. A public facility is provided at a fixed location with a facility locating module (block 310), for example, as described above. A wireless signal is generated from the facility locating module (block 320). Software code accessible to a portable electronic device is provided (block 330). The software causes the portable electronic device to detect the wireless signal (block 340). The software processes the detected wireless signal to generate a location indicating output (block 350), for example, as described above.

In one exemplary embodiment, as shown, a facility locating module 20 associated with a public facility A includes a sensor 26 configured to detect a condition of the public facility A (e.g., out of service, loss of power, low battery, in use, needs maintenance, refilling, and/or cleaning). Based on the detected condition, the sensor may cause the facility locating module to discontinue, cease, or otherwise prevent transmission of the signal S (e.g., to prevent drawing users to a public facility A that is unavailable). Additionally or alternatively, the sensor 26 may cause the facility locating module 20 to emit a maintenance signal Sm, detectable by a portable electronic device 30m used by an administrator or maintenance personnel to notify the personnel of a public facility A in need of maintenance or repair. The sensor 26 may include, for example, a limit or proximity switch, a temperature sensor, or an optic sensor.

According to another exemplary aspect of the present application, one or both of a public facility and a portable electronic device may be located by communication signals with a central computer system or server. As one example, communication between a central system and a public facility may enable location of a public facility that is relocated from time to time (e.g., fire extinguisher, first aid kit). Although some public facilities may be relocated from time to time, they are still considered to be generally stationary or fixed in location. As another example, communication between a central system and a portable electronic device may enable identification of a relative position of a fixed public facility with respect to a moving portable electronic device. As still another example, communication between a central system and both a portable electronic device and a public facility may enable identification of a relative position of a movable public facility with respect to a moving portable electronic device. A movable public facility, as used herein, is placed in fixed locations for periods of time.

Figure 2:
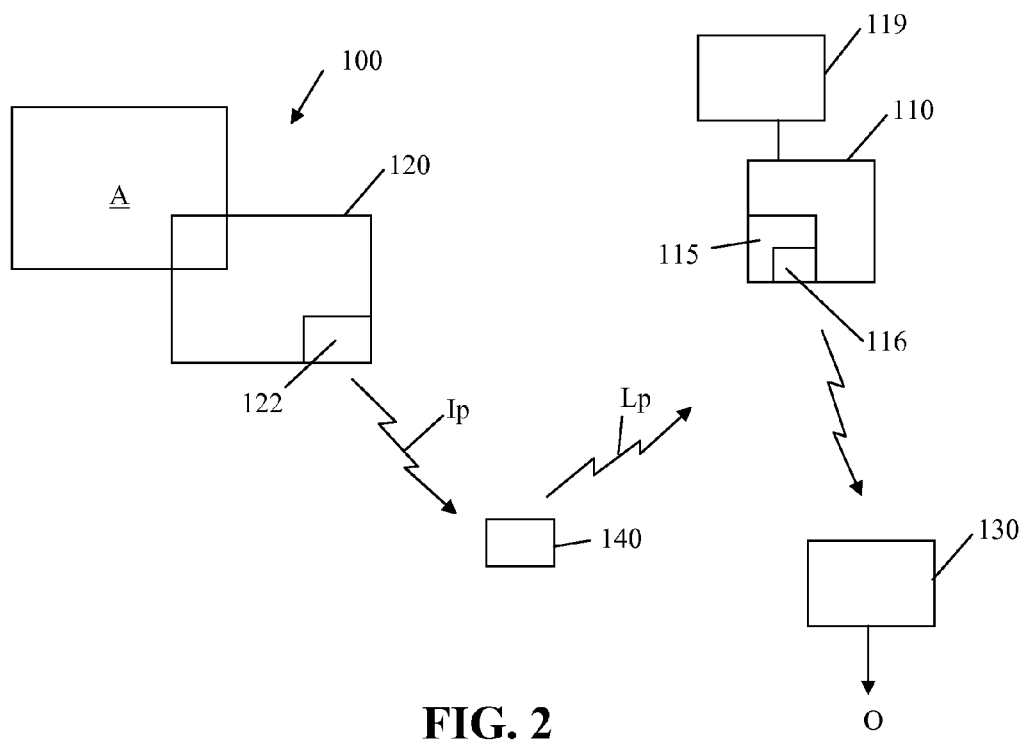
FIG. 2 is a schematic view of another electronic facility locating system, according to an exemplary embodiment.

In an exemplary embodiment, as shown in FIG. 2, an electronic facility locating system 100 includes at least one public facility A that is associated with a facility locating module 120 configured to transmit an interrogation signal $I_p$ to a location identifying module 140 within a range of the facility locating module 120. The locating identifying module 140 is configured to transmit a locating signal $L_p$ to a central station 110 in response to receipt of the interrogation signal $I_p$ to identify the public facility's proximity to the location identifying module 140. A portable electronic device 130 is configured to communicate with the central station 110 to determine an estimated location of the public facility A based on the locating signal $L_p$, and to generate a location identifying output O to communicate to the user one or more of a location, location description, direction, distance, and relative proximity of the public facility A.

While the facility locating system may be configured to utilize one or more of a variety of wireless communication systems, in an exemplary embodiment, a facility locating module 120 includes a processor 122 connected via a wireless local area network (WLAN) or cellular communication to a central computer 110 maintaining a web-based location detection system 115. The processor 122 delivers a WLAN interrogation signal I to a nearby WLAN hotspot or access point 140, which communicates to the location detection system 115 an identity of the public facility A (e.g., in the form of a MAC address of the associated processor 122). The location detection system 115 may include a public facility location identifying database 116 that tracks locations of the public facility identifiers (e.g., the registered MAC addresses) provided by the processors 122 associated with the public facilities A based on the access points 140 with which the associated processors 122 communicate. A user may download or otherwise obtain access to the database 116 on a portable electronic device 130 (e.g., as a smart phone application) to communicate or output the absolute or relative locations of the nearest public facilities A to the portable electronic device 130, which may be used to generate a location indicating output L, as described above, from the portable electronic device 130. Additionally or alternatively, access to the database 116 may be obtained from a separate fixed or portable station 119 configured to generate the location indicating output O for communication to a user (e.g., by telephone communication or text message).

Figure 5:
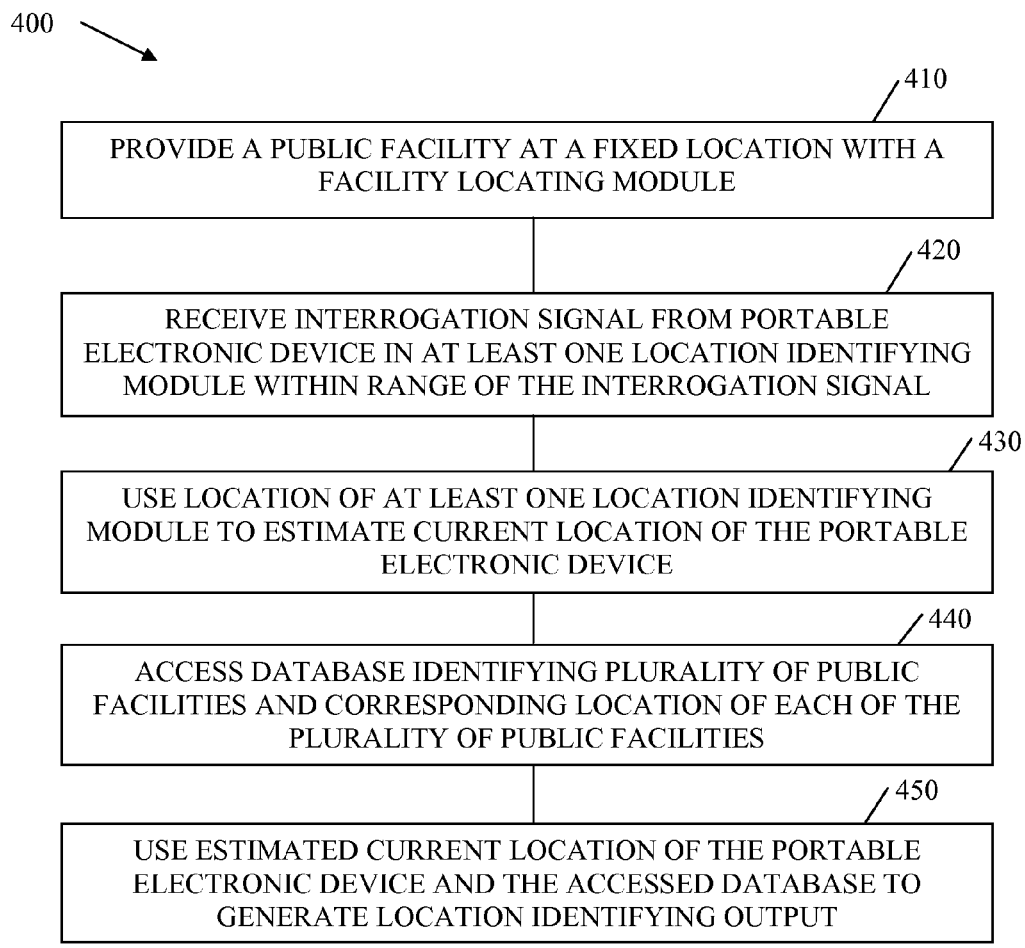
FIG. 5 is a block diagram of another exemplary method for locating a public facility.

FIG. 5 illustrates an exemplary method 400 for locating a public facility. The public facility is provided at a fixed location with a facility locating module (block 410), for example, as described above. An interrogation signal is received from a portable electronic device in at least one location identifying module within range of the interrogation signal (block 420). A location of the at least one location identifying module is used to estimate a current location of the portable electronic device (block 430). A database identifying a plurality of public facility and a corresponding location of each of the plurality of public facilities is accessed (block 440). The estimated current location of the portable electronic device and the accessed database are used to generate a location identifying output (block 450), for example, as described above.

As shown and described in the exemplary embodiment of FIG. 2, a portable electronic device may be used to locate a public facility without communication between the portable electronic device and a facility locating module. In another exemplary embodiment, an electronic facility locating system may utilize a combination of communication of one or both of a portable electronic device and a facility locating module with a central computer (as with the embodiment of FIG. 2), and communication between the facility locating module and the portable locating device (as with the embodiment of FIG. 1). In one such example (not shown), a portable electronic device may initially identify the existence of and approximate a general location of a nearby public facility using communication of at least one of the portable electronic device and the facility locating device and the central computer via one or more access points to approximate the location of at least one of the portable electronic device and the public facility based on the know location of the one or more access points. When the portable electronic device is brought within a transmission range of the facility locating module, direct transmission of a signal from the facility locating module to the portable electronic device provides additional information on proximity, direction, or other such facility locating conditions (e.g., using RSSI).

Figure 3:
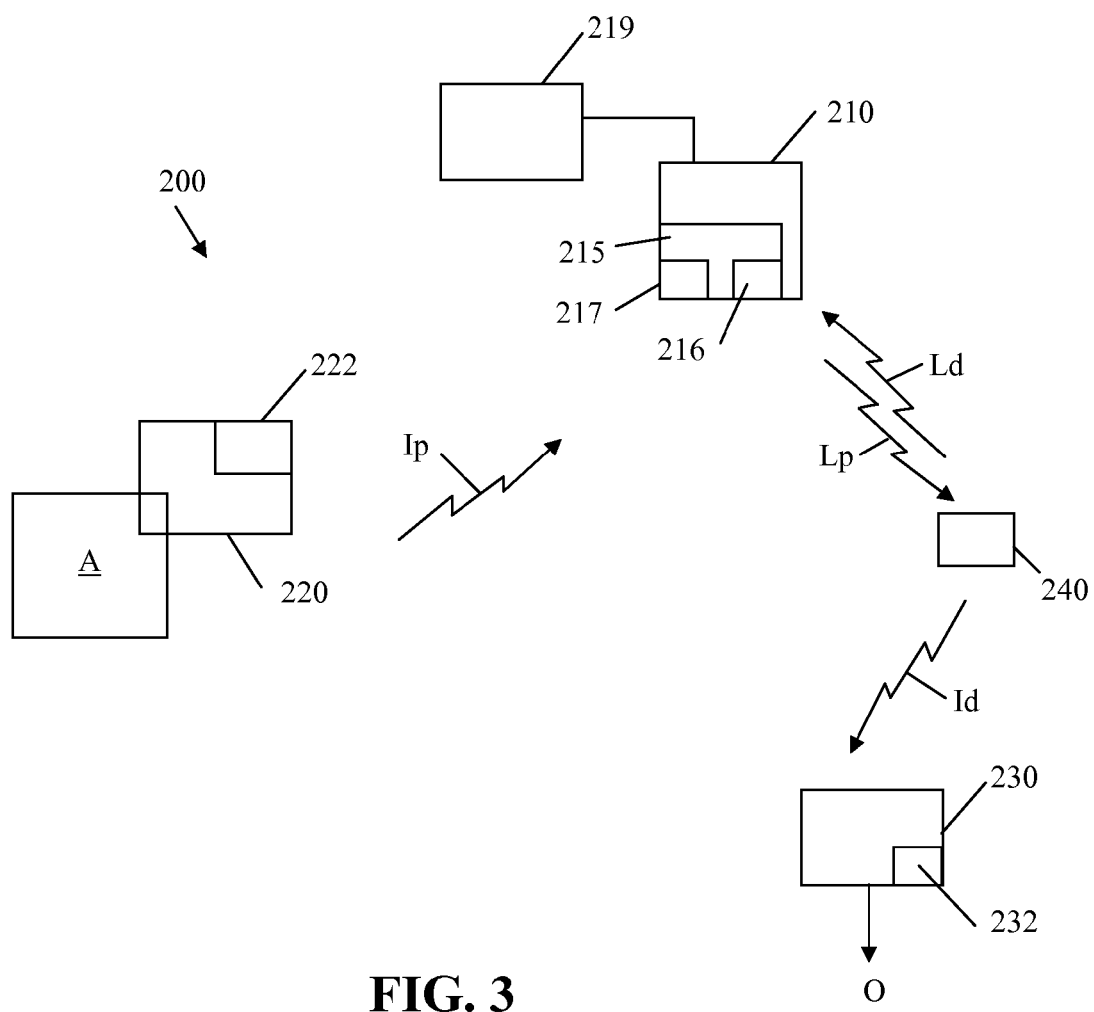
FIG. 3 is a schematic view of a yet another electronic facility locating system, according to an exemplary embodiment.

In an exemplary facility locating system, the user's location (e.g., coordinates, nearest identifiable landmark/feature, etc.) is manually or automatically entered into the portable electronic device. In another exemplary facility locating system 200, as shown in FIG. 3, the portable electronic device 230 may be configured to transmit an interrogation signal $I_d$ to a location identifying module 240 within a range of the portable electronic device 230. The locating identifying module 240 is configured to transmit a locating signal $L_d$ to a central station 210 in response to receipt of the interrogation signal $I_d$ to identify the portable electronic device's proximity to the location identifying module 240. The central station 210 is configured to communicate with the portable electronic device 230 to provide an estimated location of the portable electronic device 230 based on the locating signal $L_d$, for generation of a location identifying output O to communicate to the user one or more of a location, location description, direction, distance, and relative proximity of the public facility A. This communication may be routed through one or more location identifying modules 240.

While the facility locating system 200 may be configured to utilize one or more of a variety of wireless communication systems, in an exemplary embodiment, the portable electronic device includes a processor 232 connected via a wireless local area network (WLAN) or cellular communication to a central computer 210 maintaining a web-based location detection system 215. The processor 232 delivers a WLAN interrogation signal $I_d$ to a nearby WLAN hotspot or access point 240, which communicates to the location detection system 215 an identity of the portable electronic device 230 (e.g., in the form of a MAC address of the associated processor 232). The location detection system 215 may track locations of portable electronic devices (e.g., the registered MAC addresses) provided by the processors 232 associated with the portable electronic devices 230 based on the access points 240 with which the associated processors 232 communicate. A user may download or otherwise obtain access to a database 216 on a portable electronic device 230 (e.g., as a smart phone application) to communicate or output the absolute or relative locations of the nearest public facilities A to the portable electronic device 230, which may be used to generate a location indicating output O, as described above, from the portable electronic device 230. Additionally or alternatively, access to the database 216 may be obtained from a separate fixed or portable electronic device 219 configured to receive the locating signal $L_d$ and to generate the location indicating output O for communication to a user (e.g., by telephone communication or text message).

The database 216 may, but need not, additionally track and maintain identities and locations (e.g., coordinates and/or location descriptions) of the public facilities A, as described above. Alternatively, the central computer 210 may maintain a separate database 217 for tracking or storing determined locations of one or more public facilities A. This database 217 may be updated periodically (e.g., automatically and/or by user request) by downloading a current database or database revisions from an associated server. Additionally or alternatively, the locations of the public facilities A may be similarly tracked using registered MAC addresses of processors 222 of facility locating modules 220 associated with each of the public facilities A communicated from the facility locating module 220 to the central computer 210 via the access point 240, as described above with regard to the embodiment of FIG. 2.

Figure 6:
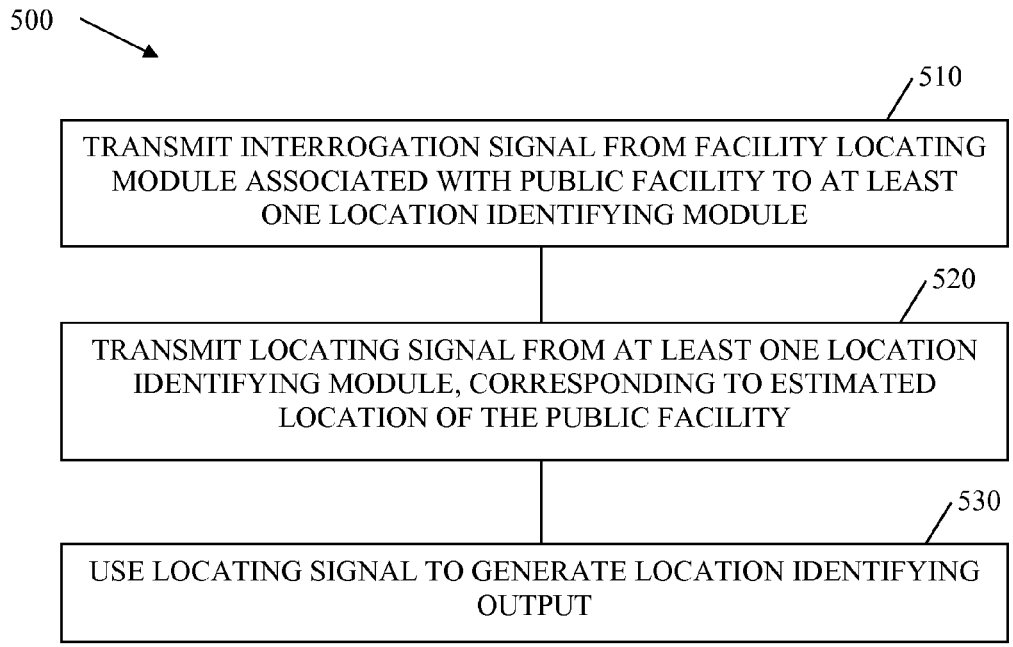
FIG. 6 is a block diagram of yet another exemplary method for locating a public facility.

FIG. 6 illustrates an exemplary method 500 for locating a public facility. An interrogation signal is transmitted from a facility locating module associated with the public facility to at least one location identifying module (block 510). A locating signal is transmitted from the at least one location identifying module, corresponding to an estimated location of the public facility (block 520). The locating signal is used to generate a location identifying output (block 530), for example, as described above.

In other embodiments, other arrangements for locating a portable electronic device may be utilized, such that facility locating modules or location identifying modules associated with or proximate to the public facilities are not required. In such an embodiment, a portable electronic device may be configured to determine its geographic location, without determining a location relative to a local device (e.g., a facility locating module or a location identifying module). The portable electronic device may then access a database of known facilities and their locations, and using the determined location of the portable electronic device, identify to the user, a direction, distance, and/or description of a public facility. Exemplary systems for determining a geographic location of a portable electronic device include global positioning systems, cellular network locating systems, multiple degree-of-freedom locating sensor systems (using, for example, one or more accelerometers, altimeters, pedometers, and gyroscopes), or a combination of these systems. For example, in one exemplary application, a portable electronic device may be located using a global positioning system while the device is outside, and automatically switching to location by a multiple degree-of-freedom locating sensor system when GPS satellite signals are lost (e.g., when the portable electronic device enters a building).

Figure 7:
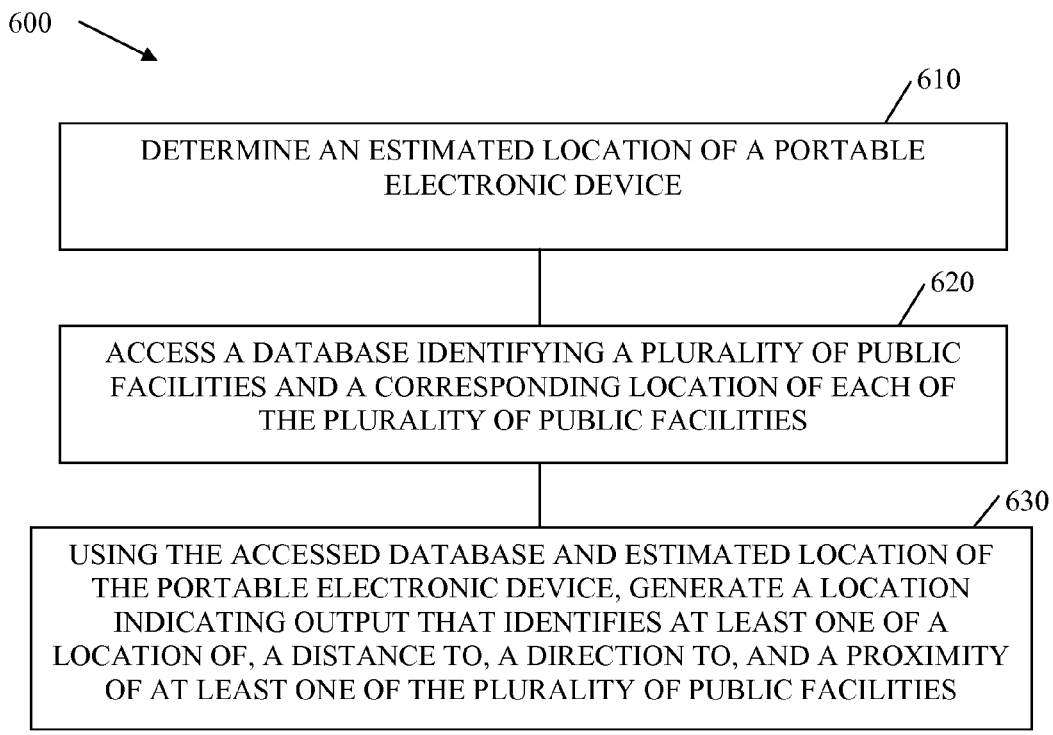
FIG. 7 is a block diagram of yet another exemplary method for locating a public facility.

FIG. 7 illustrates an exemplary method 600 for locating a public facility. An estimated location of a portable electronic device is determined (block 610). A database identifying a plurality of public facility and a corresponding location of each of the plurality of public facilities is accessed (block 620). The estimated current location of the portable electronic device and the accessed database are used to generate a location identifying output identifying at least one of a location of, a direction to, a proximity to, or a distance to at least one of the plurality of public facilities (block 630).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:
1. A method for locating dispenser for dispensing one of a soap and a sanitizer, the method comprising:
   providing a plurality of dispensers for dispensing one of a soap and a sanitizer, each at a generally fixed location, with each dispenser including a facility locating module;
   providing a central station remote from the dispenser, the central station storing a database identifying the plurality of dispensers and a location of each of the plurality of dispensers;
   transmitting a wireless signal from one of the plurality of facility locating modules to the central station to update information in the database with regard to at least one of the location of the corresponding dispenser and a status of the corresponding dispenser; and providing software code accessible to a portable electronic device, the software code causing the portable electronic device to access the database and use the information in the database in combination with a location of the portable electronic device determined by the portable electronic device, without communication with the plurality of facility locating modules, to generate a location indicating output corresponding to a location of a nearest one of the plurality of dispensers relative to a location of the electronic device, to identify the estimated location of the nearest one of the plurality dispensers, a distance to the estimated location of the nearest one of the plurality dispensers from the portable electronic device, and a direction from the portable electronic device to the estimated location of the nearest one of the plurality of dispensers.

2. The method of claim 1, wherein the wireless signal comprises at least one of a Bluetooth signal, an RFD signal, and a wireless local area network (WLAN) signal.

3. The method of claim 1, wherein the output identifying the distance to the dispenser from the portable electronic device comprises an audible signal for which at least one of volume, pitch, and frequency varies in proportion to the received signal strength indication.

4. The method of claim 1, wherein the output identifying the distance to the dispenser from the portable electronic device comprises a visual signal for which at least one of size, intensity, color, and frequency varies in proportion to the received signal strength indication.

5. The method of claim 1, wherein the wireless signal further includes information relating to at least one of a description of the dispenser, and a condition of the dispenser.

6. The method of claim 1, wherein the portable electronic device comprises at least one of a cell phone, a smart phone, a tablet computer, and a laptop computer.

7. The method of claim 1, further comprising downloading an application to the portable electronic device, the application being programmed to generate the location indicating output.

* * * * *